March 13, 1962 H. J. GERMANN 3,024,488
HINGE DEVICE FOR AUTOMOBILES
Filed Sept. 30, 1959 2 Sheets-Sheet 1

INVENTOR
Herbert J. Germann
BY
Wayne B. Easton

March 13, 1962 H. J. GERMANN 3,024,488
HINGE DEVICE FOR AUTOMOBILES
Filed Sept. 30, 1959 2 Sheets-Sheet 2

INVENTOR
Herbert J. Germann
BY
Wayne B. Easton

United States Patent Office 3,024,488
Patented Mar. 13, 1962

1

3,024,488
HINGE DEVICE FOR AUTOMOBILES
Herbert J. Germann, Three Rivers, Mich., assignor to Studebaker-Packard Corporation, South Bend, Ind., a corporation of Michigan
Filed Sept. 30, 1959, Ser. No. 843,396
4 Claims. (Cl. 16—128.1)

This invention relates to a hinge device which may be utilized for hingedly attaching a rear deck lid or a hood lid to a vehicle body.

It is a main object of the invention to provide a new and improved hinge device which comprises a relatively few number of parts, has no parts which require machining, is inexpensive to manufacture and is readily installable.

Other objects of the invention will become apparent from the following specification, the drawing relating thereto, and the appended claims.

Figure 1:
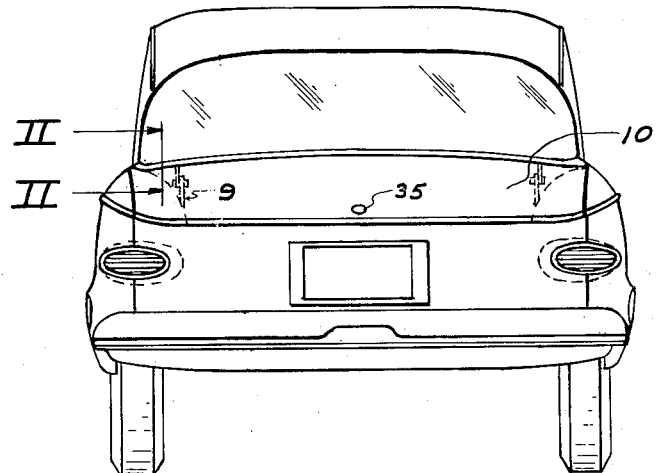
FIG. 1 shows a view of an automobile from the rear having two hinge devices of the present invention for the trunk lid thereof.

Referring to the drawing, there is shown in FIG. 1 a view of an automobile from the rear having a hinge device 9 made in accordance with the present invention for a trunk lid or closure member 10 which is shown in a closed position. As viewed from line II—II of FIG. 1, a side view of the hinge device 9 preferably provided for each side of the lid 10 as indicated in FIG. 1 but the providing of only one hinge device would be unsatisfactory as far as the scope of the invention is concerned.

Figure 4:
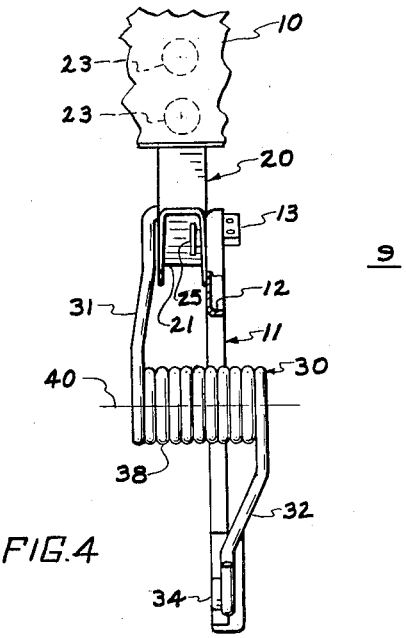
FIG. 4 is an end view of the hinge device in its open position.
Figure 2:
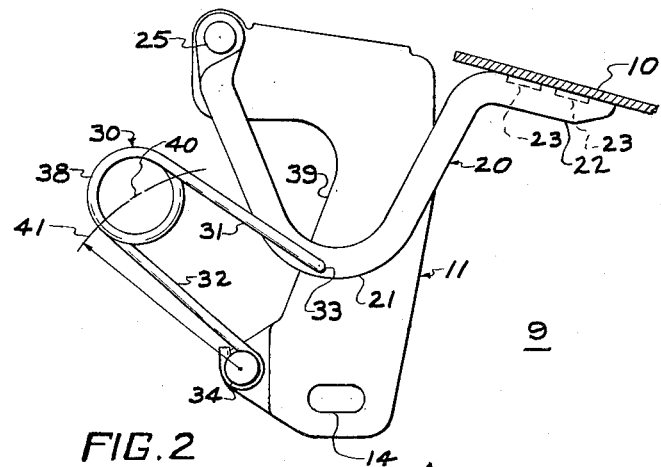
FIG. 2 shows an enlarged side view of the hinge device of the present invention in its closed position as it would be viewed from line II—II of FIG. 1.
Figure 3:
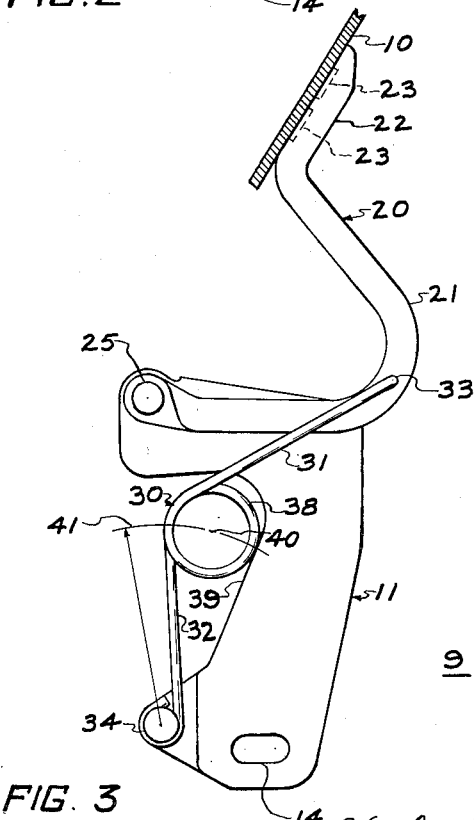
FIG. 3 shows a side view similar to the view of FIG. 2 except that the hinge device is shown in its open position.

The hinge device 9, as shown in detail in FIGS. 2 to 4, has a bracket member 11 which is adapted to be fastened to the automobile body in a position inside the trunk compartment. Bracket member 11 may be a stamping and as illustrated has an upper horizontal portion and a vertical portion so that in general its shape has the appearance of the numeral "seven." The bracket has a flange 12 around its perimeter by reason of being formed by a stamping operation. The upper or horizontal portion of bracket member 11 has a flange 13 with two holes therein and the lower portion of the bracket has a hole or slot 14 and it is by these means that the bracket is adapted to be attached to the automobile body.

A hinge member 20 is provided which has a U-shaped portion 21 and a portion 22 which extends from and is generally perpendicular to one leg of the U. Hinge member 20 is formed from channel shaped stock and a section therethrough is thus channel or U-shaped.

One end of hinge member 20, portion 22, is attached to the closure member 10 with fastening means 23 and to facilitate the fastening means suitable holes are provided in portion 22 of the hinge member.

Hinge member 20 is pivotally connected at its other end to the upper horizontal portion of bracket member 11 by means of an up-ended bolt 25 or the like so that the hinge has pivotal movement relative to the bracket about a horizontal axis which extends transversely of the car.

With the structure described thus far the closure member 10 is adapted to swing between open and closed positions and, by reason of the weight of closure member 10, it is biased or acted upon the gravity to move to its closed position. A spring 30 is provided which exerts a raising

2 force to counterbalance and exceed the force of gravity on closure member 10 for the entire range of swinging movement of closure member 10 from its closed position to its open or raised position. The force exerted by spring 30 is just sufficient so that when the latch or locking mechanism 35 (see FIG. 1) of closure member 10 is released the closure member 10 will be raised slowly from its closed position to its open position. Spring 30 is prestressed to a suitable degree prior to being installed so that it will exert a suitable lifting force as desired.

Spring 30 is a torsion type coil spring having a first tangentially extending end portion 31 connected to hinge member 20 and a second tangentially extending end portion 32 connected to bracket member 11.

End portion 31 of the spring is pivotally connected to hinge 20 at the bottom of U-shaped portion 21 and this attachment point is between the hinge pivot axis represented by bolt 25 and the point of attachment between the hinge and closure member 10. The terminal end of end portion 31 of the spring is bent and extends through holes 33 in the hinge and this forms a pivotal connection between spring 30 and the hinge.

End portion 32 of the spring is pivotally connected to the lower portion of bracket member 11 by means of a bolt 34 which extends through a hole in the bracket. The terminal end of end portion 32 is bent around the stem of bolt 34 and this forms a pivotal connection between spring 30 and the bracket.

Spring 30 has what is referred to herein as a floating center coil portion 38. Coil portion 38 has a plurality of coils and it is referred to as having a floating center or axis 40 because coil portion 38 does not have a fixed axis and is free to move or float when closure member 10 is raised and lowered. As closure member 10 is raised and lowered coil portion 38 moves respectively towards and away from an abutment surface 39 on bracket member 11. The center or axis 40 of coil portion 38 moves in an arc 41 about the pivot axis of spring portion 32 which is represented by bolt 34.

As illustrated, spring portions 31 and 32 form an acute angle relative to each other when closure member 10 is in a closed position and an obtuse angle when the closure member is in a raised position. Further as illustrated, spring portions 31 and 32 extend tangentially from points which are diametrically opposite the area of contact between coil portion 38 and abutment surface 39.

A feature of the invention is that spring coil portion 38, which straddles bracket member 11, engages abutment surface 39 of the bracket when closure member 10 is in its raised position and the raised position of the closure member is thus defined and limited by the contact of spring portion 38 with the abutment surface. Spring portion 38 is transversely resilient to some extent and an inherent cushioning device is thus provided which cushions the stopping of the closure member when it moves to its raised position without requiring the adding of any parts to the hinge device for this purpose.

The invention may be embodied in other specific forms without departing from the spirit or essential characteristics thereof. The embodiment of the invention described and shown is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A hinge device for swingably connecting a closure member to a vehicle body to swing between open and closed positions, said closure member being biased by gravity toward a closed position, said hinge device comprising: a bracket member adapted to be connected to said body and having an abutment surface; a hinge member having one end thereof adapted to be attached to said closure member and being pivotally connected to said bracket member to provide for swinging movement of said closure member; a torsion type coil spring having a first tangentially extending end portion pivotally connected to said hinge member and a second tangentially extending end portion pivotally connected to said bracket member and said spring being prestressed to exert a force on said hinge to raise said closure member from its closed position to its open position against the downward pull of gravity thereon, said spring having a floating center coil portion engageable with said abutting surface of said bracket member to limit the raised position of said closure member, and said center coil portion being moveable towards and away from said abutment surface in an arc about the pivot axis on said bracket member of said second end portion of said spring when said closure member is raised and lowered respectively.

2. A hinge device for swingably connecting a closure member to a vehicle body to swing between open and closed positions, said closure member being biased by gravity toward a closed position, said hinge device comprising: a bracket member adapted to be connected to said body and having an abutment surface; a hinge member having one end thereof adapted to be attached to said closure member and being pivotally connected to said bracket member at a point above said abutment surface thereof to provide for swinging movement of said closure member; a torsion type coil spring having a first tangentially extending end portion connected to said hinge member and a tangentially extending end portion connected to said bracket member and said spring being prestressed to exert a force on said hinge to raise said closure member from its closed position to its open position against the downward pull of gravity thereon, said second end portion of said spring being connected to said bracket member at a point below said abutment surface thereof, said spring having a floating center coil portion engageable with said abutting surface of said bracket member to limit the raised position of said closure member, and center coil portion being moveable towards and away from said abutment surface in an arc about the connection between said bracket member and said second end portion of said spring when said closure member is raised and lowered respectively.

3. A hinge device for swingably connecting a closure member to a vehicle body to swing between open and closed positions, said closure member being biased by gravity toward a closed position, said hinge device comprising: a bracket member adapted to be connected to said body and having an abutment surface; a hinge member having one end thereof adapted to be attached to said closure member and being pivotally connected to said bracket member at a point above said abutment surface thereof to provide for swinging movement of said closure member; a torsion type coil spring having a first tangentially extending end portion connected to said hinge member and a second tangentially extending end portion connected to said bracket member and said spring being prestressed to exert a force on said hinge to raise said closure member from its closed position to its open position against the downward pull of gravity thereon, said first end portion of said spring being connected to said hinge member at a point between the first axis of said hinge member and the connection between said hinge member and said closure member, said spring having a floating center coil portion engageable with said abutting surface of said bracket member to limit the raised position of said closure member, and said center coil portion being moveable towards and away from said abutment surface in an arc about the connection between said bracket member and said second end portion of said spring when said closure member is raised and lowered respectively.

4. A hinge device for swingably connecting a closure member to a vehicle body to swing between open and closed positions, said closure member being biased by gravity toward a closed position, said hinge device comprising: a bracket member adapted to be connected to said body and having an abutment surface on the rearward side thereof; a hinge member having one end thereof adapted to be attached to said closure member and being pivotally connected to said bracket member at a point above said abutment surface thereof to provide for swinging movement of said closure member; a torsion type coil spring having a first tangentially extending end portion pivotally connected to said hinge member and a second tangentially extending end portion pivotally connected to said bracket member and said spring being prestressed to exert a force on said hinge to raise said closure member from its closed position to its open position against the downward pull of gravity thereon, said one end portion of said spring being connected to said hinge member at a point between the pivot axis of said hinge member and the connection between said hinge member and said closure member, said other end portion of said spring being connected to said bracket member at a point below said abutment surface thereof, said spring having a floating center coil portion engageable with said abutting surface of said bracket member to limit the raised position of said closure member, and said center coil portion being moveable towards and away from said abutment surface in an arc about the pivot axis on said bracket member of said second end portion of said spring when said closure member is raised and lowered respectively.

References Cited in the file of this patent

UNITED STATES PATENTS

| | | |
|---|---|---|
| 2,235,984 | Devereaux | Mar. 25, 1941 |
| 2,894,276 | Wulff | July 14, 1959 |

FOREIGN PATENTS

| | | |
|---|---|---|
| 673,279 | Great Britain | June 4, 1952 |